350-1.1 SR

XR 3,764,772

SEARCH ROOM

United Sta

Matuschek

[11] 3,764,772

[45] Oct. 9, 1973

~~SUBSTITUTE FOR MISSING XR~~

[54] APPARATUS FOR INFRARED SOLDERING

[75] Inventor: Max Matuschek, Munich, Germany

[73] Assignee: Siemens Aktiengesellschaft, Berlin & Munich, Germany

[22] Filed: Jan. 14, 1972

[21] Appl. No.: 217,727

[30] Foreign Application Priority Data

Feb. 5, 1971 Germany .................. P 21 05 513.0

[52] U.S. Cl. ...................... 219/85, 29/626, 219/347

[51] Int. Cl. ................................................ B23k 1/02

[58] Field of Search .................... 219/347, 349, 354, 219/85; 29/626, 471.1; 228/44

[56] References Cited

UNITED STATES PATENTS

| | | | |
|---|---|---|---|
| 3,486,004 | 12/1969 | Morrone | 219/85 X |
| 3,583,063 | 6/1971 | Growney | 29/471.1 |
| 2,601,011 | 6/1952 | Wilcox | 219/354 X |
| 3,486,223 | 12/1969 | Butera | 29/626 |
| 3,562,481 | 2/1971 | West | 219/85 |
| 3,205,572 | 9/1965 | Jochems | 219/85 X |

*Primary Examiner*—R. F. Staubly
*Assistant Examiner*—L. A. Schutzman
*Attorney*—Carlton Hill et al.

[57] ABSTRACT

A safe, easily controlled method and apparatus for infrared soldering of component means to a carrier plate means includes the steps of positioning a carrier plate means on a filter plate means, which filter plate is of a material that absorbs visible light and allows infrared light to pass therethrough, with the lower side of the carrier plate means generally resting on an upper side of the filter plate means, providing a source of infrared light below the filter plate means and projecting it through the filter plate means against the lower side of the carrier plate means whereby solder at a solder point on the carrier plate means is heated from the infrared light and melts. The component means which may be held in a holder means is moved into contact with the melted solder and the connection effected. The filter plate means may be preheated by a heating means in the base of the apparatus surrounding the filter plate means. A control means moves the holder means and adjusts the energy of the infrared light source in relation to the position of the holder means with respect to the carrier plate means. A reflector allows exact focusing of the infrared light on the carrier plate means at a point opposite the solder point.

7 Claims, 2 Drawing Figures

APPARATUS FOR INFRARED SOLDERING

BACKGROUND OF THE INVENTION

1. Field of the Invention

This invention generally relates to a method and apparatus for joining elements and specifically concerns an infrared soldering method for attaching component members such as small electrical components onto a carrier means having tinned conductor paths or soldering terminals. An infrared light positioned below a filter plate means is beamed toward a carrier plate means lying on the opposite side of the filter plate means to melt solder on the carrier plate means and allow connection of the components thereto.

2. Prior Art

According to known methods of soldering contacts onto circuit plates, the solder point is heated to the soldering temperature from the side to be soldered by an infrared light which is focused directly onto the solder point. Solder is fed in precise quantities into the focal area of the infrared light and the connecting lug or similar parts are soldered according to the known procedure. This prior art method is mainly used for soldering components onto electric circuit boards. It is well known, however, that certain semiconductive components such as miniature coils etc., must not be heated to more than 70° centigrade. If such small and temperature sensitive components are to be soldered onto small ceramic carrier plates, for example, there is a danger that the components may be hit by thermal radiation and be thereby damaged or destroyed. Moreover, there is also the danger in these prior art methods that the light will be reflected and could blind the operating personnel. This blinding is especially dangerous if a laser is being used as the infrared light source or if the light source has a high percentage of short wave light.

SUMMARY OF THE INVENTION

The difficulties and disadvantages of the prior art are avoided by the method and apparatus of the invention herein. Thus, by means of my invention small electrical components may be quickly and accurately soldered onto small ceramic plates under very safe working conditions. By means of the invention herein the problems of the prior art are overcome by placing the carrier plate with a lower side thereof generally in engagement with a glass filter plate means below which there is provided a source of infrared light. The filter plate means is of a material which absorbs the visible or short wavelight and allows the infrared light to pass therethrough into contact with the lower side of the carrier plate means. The infrared light is focused to a point on the lower side of the carrier plate means which is opposite a solder point on the upper side of the carrier plate means to which the component is to be attached. The heat is transmitted through the carrier plate and melts the solder to allow attachment of the component means. Thus, the invention avoids the aforementioned drawbacks which occur in the prior art methods of infrared soldering.

The method according to the invention may be advantageously used for soldering thin ceramic plates or glass plates. By placing the carrier onto the glass filter plate means the visible part of the light is prevented from shining through the filter plate whereby the long wave thermal radiation is allowed to reach the carrier plate. I have found it advantageous to preheat the filter plate glass and the carrier plate lying thereon. This procedure has the effect, among other things, of preventing cracking of the small ceramic or glass plates and at the same time prevents damage to the filter glass plate caused by localized heating. The carrier plate is preferably preheated by means of a heat source which surrounds the filter glass plate and is positioned under it. Advantageously, the preheating temperature may be adjusted and thermostatically controlled to a level approximately 30° to 40° centigrade below the melting point of the solder. If the infrared light is than focused on the carrier plate means at a point below the solder point an immediate soldering of the solder takes place. It will be noted that by my invention there is no danger of a blinding effect on the operator during this procedure. Accordingly, the solder process may be safely observed through a microscope.

The apparatus for carrying out the aforementioned method of infrared soldering comprises a base which includes a glass filter plate means of a material which absorbs short wave visible light and an infrared light source arranged under the glass filter plate.

It is a further feature of the invention that the infrared light source and an infrared reflector can be adjusted relative to each other in such a way that the light emitted from the infrared lamp can be directed to hit the underside of the carrier lying on the filter glass plate either at a concentrated area of a point or over a larger concentrated area which is usually a circular area.

The glass filter plate means is held generally about its periphery by a heating means which may form a ring about the filter plate means to preheat the filter plate means and the supported carrier plate means. The heating means may be of an electric resistance construction which has suitable controls allowing it to be adjusted to a predetermined temperature and may be controlled thermostatically to maintain this temperature.

A holder means designed to accept the component which is to be soldered to the carrier plate is arranged generally in the extended optical axis of the infrared light source and is on the opposite side of the filter plate means from the infrared light source. The holder means rests in a vertically adjustable guiding device in such a way that the component may be moved in a predetermined direction from a position remote from the carrier plate to a position where the component has a portion thereof in contact with the solder point on the carrier plate. A suitable control is provided for movement of the holder means. It is an important feature of this invention that the control means for the movement of the holder means cooperates with a control device for regulating the function of the infrared light source. Thus, by means of this interlocking control it is possible that in lowering the component held by the holder means onto the carrier means the performance of the infrared light source such as a halogen lamp for example, is increased simultaneously and in proportion to the movement of the holder in such a way that the solder applied at the solder point on the carrier plate means melts just before the component comes into contact therewith. Accordingly, when the component is placed upon the carrier it in effect is dipped into the liquid solder. This feature provides for safe and rapid operations.

Once the component has reached the solder point the component may be taken from the holder means by electrically controlled clamping jaws and the holder may than be free to return to its initial position. While the holder is moving back to the original position the function of the infrared light source is simultaneously throttled by the interlocking control and the solder point may be simultaneously cooled by an air current to speed up the process.

BRIEF DESCRIPTION OF THE DRAWINGS

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure and in which.

DESCRIPTION OF THE PREFERRED EMBODIMENTS

Figure 1:
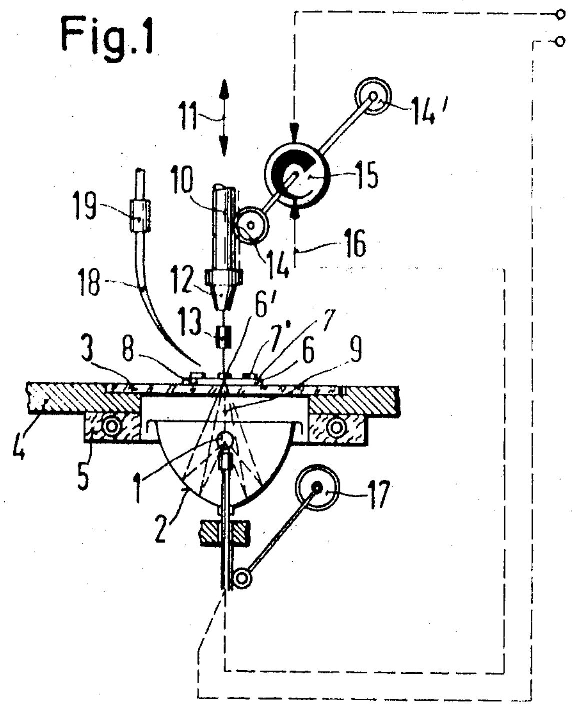
FIG. 1 is a schematic elevational view of the apparatus with parts in cross section; and, FIG. 2 is a perspective view of an embodiment of the invention showing the location of controls and an accompanying microscope means.

The infrared soldering apparatus as shown in FIG. 1 basically comprises an infrared light source 1 which may be a halogen lamp for example, an infrared reflector means 2 advantageously constructed in the form of ellipsoid mirror, a base including a filter glass plate means 3 which is formed of a material that absorbs visible or short wave length light and allows infrared light to generally pass therethrough and a ring-shaped support 4 with a ring-shaped heating means 5 therein. The support 5 may be suitably notched to present a flush surface when the filter plate means 3 is in position. While the heating means 5 is schematically illustrated in FIG. 1 as being below the support 4 it will be understood that it may be incorporated in the support 4 and may be of any suitable type which allows close temperature control. Where the heating means 5 is an electric resistance means as shown, I have found it advantageous to position it generally about the periphery of the filter plate means 3 so that the filter plate 3 and a carrier plate means 6 such as shown supported thereon may be preheated to prevent cracking or other stresses resulting from temperature differences caused by the localized infrared heating. Suitable controls are provided as will be hereinafter explained.

The carrier plate means 6 which may be a small ceramic plate, for example, has a first or upper surface 7 and an opposite second or lower surface 8. The lower surface 8 is generally in heat transmitting contact with the filter plate means 3 and as shown may be two generally planar contacting surfaces. The upper surface 7 of the carrier plate means 6 may have electrical circuit means 7′ thereon and further include solder arranged at solder points 6′. The solder may be applied to the carrier plate means 6 at the solder point 6′ by means of dip soldering or by depositing solder forming particles. It is also possible that the solder may be fed to the solder point in predetermined quantities and at predetermined times in conjunction with the operation of the apparatus.

Figure 2:
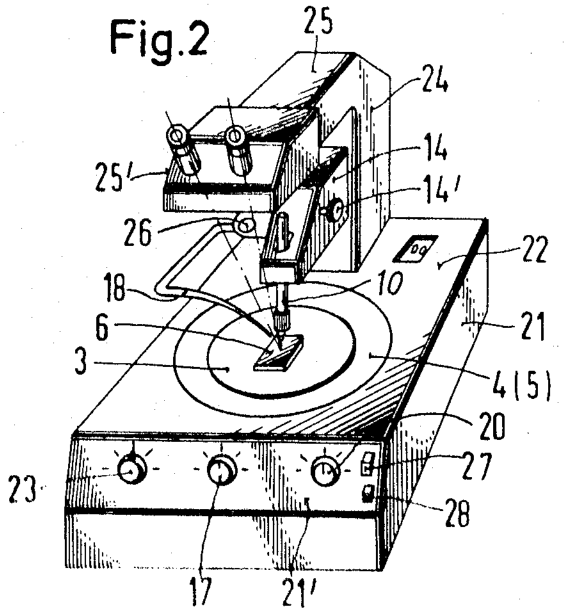

A component holder means 10 may be arranged in coaxial relationship to an optical axis 9 of the infrared light source 1 as shown by a dotted line in FIG. 1. The ellipsoid mirror 2 will of course have a central axis thereof coaxial with the optical axis 9 to facilitate focusing of the infrared light. The holder means 10 is suitably supported as shown in FIG. 2 and moved by a suitable operating means 14 so that it can be moved toward and away from the filter plate means 3 in a direction of the arrows indicated at 11. The holder means 10 includes suitable means such as a chuck 12 for holding an electrical component 13 which is to be soldered to the carrier plate means 6.

The tool holder operating means 14 may be suitably interlocked with a control means such as a potentiometer 15, for example, whereby the energy level of the infrared light source will be adjusted in relationship to the movement of the component holder means 10. Thus, as the component holder means 10 moves toward the filter plate means 3 the energy level of the infrared light source 1 will be increased to transmit a greater amount of heat which may be focused at a point on the carrier plate 6 which is directly below the solder point 6′ so that the solder will have melted by the time the component 13 is brought into engagement with the solder. In other words, the closer the component 13 gets to the solder point 6′ the greater the amount of heat which is transmitted to the solder point 6′ by the light source 1. In addition to the potentiometer 15 the control means may include a suitable circuit 16 for transmitting the operating signals and energy to the light source 1. By this means the potentiometer may be arranged in front of the infrared light source 1.

It is another feature of my invention that the infrared light source 1 which may be a halogen lamp, for example, can be moved along the axis 9 within the infrared reflector means 2 so that the emitted infrared rays indicated by dotted lines in FIG. 1 may be very accurately focused to project through the glass filter plate means 3 onto the lower side 8 of the carrier means 6. By this means the area on the carrier plate 6 which the infrared rays hit may be varied from a dot to a larger usually circular area. The movement of the infrared light source 1 relative to the reflector means 2 and the control therefor may be produced by a means generally indicated at 17. Although shown as being manually operated by the knob in FIG. 2 it is possible that the relative movement of the infrared light source 1 and the reflector means 2 may be interlocked with the movement of the component holder means 10 and/or the light source intensity control 15.

The heating means 5 has a suitable control means as shown, for example, by the sequence switch 23 in FIG. 2 whereby the level of heat may be very accurately set. This level of heat may be maintained at a particular predetermined level by a thermostat means which is not shown in the drawings but will be understood by those skilled in the art. By this means the level of heat in the carrier plate means 6 and the filter glass plate means 3 may be accurately controlled so that their temperature lies a little below the melting temperature of the solder on the upper surface 7 of the carrier plate means 6. The particular temperature differential may be varied. Thus, in one particular case the preheating temperature may be adjusted to approximately 30° to 40° centigrade below the melting temperature of the solder. This feature prevents the carrier 6 from cracking because of the dot-like thermostresses which would be created during the soldering process and, on the other hand, this feature guarantees that a relatively short time of less than one second will be required for melting the solder. As explained heretofore the component 13 to be connected to the carrier plate 6 at the solder point 6' will be moved by the holder means 10 to a position where at least a portion thereof, which portion advantageously may be pretinned, is dipped into the melted solder. At this point an electric jaw or jig holds the component 13 in position and the holder 10 is moved away from the component to thereby throttle the amount of heat applied to the solder points 6'. Simultaneously, an air current directed by a nozzle 18 and controlled by a valve 19 is made to pass over the molten solder to cool it and complete the soldered connection.

As illustrated in FIG. 2 a commercial embodiment of an infrared soldering device according to the invention may comprise a case 21 having a covering plate 22 which serves as a base or support for the support means 4, the heatable ring-shaped plate 5 and the glass filter plate means 3. The infrared light source 1 and the infrared reflector 2 are arranged in the case 21 and thereby protected from dust and dirt in the air as well as serving to protect the operator. The control means 17 for the adjustment of the focus of the infrared lamp reflector is positioned on the front end 21' adjacent the heater sequence switch 23. The operating means 14 is attached to an upwardly projecting support means 24 which is connected with the case 21 in such a way that the holder means 10 is adjustable by means of the knob 14' in a direction indicated by the arrow 11 in FIG. 1. The support member 24 also may have attached thereto a cross arm member 25 which advantageously may be equipped with a microscope 25' whereby an operator positioned in front of the case 21 may observe the welding of the very tiny and minature components. It will be understood that because of the position of the infrared light source and the practical impossibility of extraneous rays escaping that the danger of blinding by persons operating the apparatus is eliminated. An adjustment means 26 is provided for the adjustment of the blower, not shown, and serves to help control the flow of air current through the nozzle means 18. Suitable interlocking connections may be made with the other components of the apparatus including the valve means 19 so that a more or less automated operation may be obtained. The infrared light source 1 may be controlled by a switch 27 and a main or master switch 28 serves to turn the apparatus on and off. As shown, the sequence switch 20 is provided on the front end 21' for the regulation of a light means not shown, but which may be provided for the operator of the apparatus.

From the foregoing description of the invention it may be seen that a very compact, easily operated apparatus has been provided which is very safe in operation, allows very accurate production under the severest of size or temperature limitations and overcomes the many disadvantages of prior art methods and apparatus.

Although minor modifications might be suggested by those versed in the art, it should be understood that I, wish to embody within the scope of the patent warranted hereon all such modifications as might reasonably and properly come within the scope of my contribution to the art.

I claim as my invention:

1. An apparatus for infrared soldering of a component onto a carrier plate having at least one solder point thereon, said apparatus comprising a base means for supporting a filter plate of a material that absorbs visible light and passes infrared light therethrough said filter plate having an upper surface for supporting the carrier plate on which the component is to be soldered, a source of infrared light supported below said base means, a reflecting means for focusing the infrared light from the source through said filter plate into a concentrated area thereabove, and control means for changing the energy level of said source so that the intensity of the infrared light focused into the area can be raised from a low intensity to an intensity sufficient to heat a solder point on the carrier adjacent the area to the melting point when a solder connection is to be made.

2. An apparatus according to claim 1, wherein said base means supports said filter plate at is periphery and includes a heating means positioned adjacent the periphery of the filter plate, for heating the filter plate and a carrier plate supported thereon.

3. An apparatus according to claim 2 including a control means for said heating means and a thermostat means for maintaining the heat in said filter plate at a predetermined level.

4. An apparatus according to claim 2, which includes holder means for supporting a component which is to be soldered to the carrier plate, said holder means includes means for supporting the holder means at a position above the filter plate and operating means for changing the relative distance between the holder means and said filter plate, and wherein said control means is connected to said operating means so that the energy of the source is increased as the operating means moves said holder means toward the filter plate.

5. An apparatus according to claim 4, wherein said reflector means includes means for adjusting its position with respect to said source to enable changing the size of the concentrated area between a point and a larger area.

6. An apparatus according to claim 1, which includes holder means for supporting a component which is to be soldered to the carrier plate, said holder means includes means for supporting the holder means at a position above the filter plate and operating means for changing the relative distance between the holder means and said filter plate, and wherein said control means is connected to said operating means so that the energy of the source is increased as the operating means moves said holder means toward the filter plate.

7. An apparatus according to claim 1, wherein said reflector means includes means for adjusting its position with respect to said source to enable changing the size of the concentrated area between a point and a larger area.

* * * * *